United States Patent
Tseng

(10) Patent No.: US 9,134,486 B2
(45) Date of Patent: Sep. 15, 2015

(54) OPTICAL FIBER CONNECTOR SOCKET

(71) Applicant: Emit Technology Co., Ltd., New Taipei (TW)

(72) Inventor: Fan-Chen Tseng, New Taipei (TW)

(73) Assignee: EMIT TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/582,883

(22) Filed: Dec. 24, 2014

(65) Prior Publication Data
US 2015/0234131 A1  Aug. 20, 2015

(30) Foreign Application Priority Data

Feb. 19, 2014 (TW) .............................. 103202891 U
Feb. 19, 2014 (TW) .............................. 103202892 U

(51) Int. Cl.
*G02B 6/00* (2006.01)
*G02B 6/36* (2006.01)
*G02B 6/38* (2006.01)
*G02B 6/42* (2006.01)

(52) U.S. Cl.
CPC ............ *G02B 6/3893* (2013.01); *G02B 6/3821* (2013.01); *G02B 6/3825* (2013.01); *G02B 6/3897* (2013.01); *G02B 6/4249* (2013.01); *G02B 6/4292* (2013.01)

(58) Field of Classification Search
CPC .. G02B 6/3825; G02B 6/3893; G02B 6/3897; G02B 6/3821; G02B 6/4292; G02B 6/4246; G02B 6/4249
USPC .......................................................... 385/56
See application file for complete search history.

*Primary Examiner* — Akm Enayet Ullah
(74) *Attorney, Agent, or Firm* — Chun-Ming Shih; HDLS IPR Services

(57) ABSTRACT

An optical fiber connector socket is disclosed, which includes an insulated shell and a fastener. The insulated shell has a plug slot. A first opening and a second opening individually are formed on two opposite sides walls of the plug slot. A flexible hook is disposed corresponding to the second opening in the plug slot. The flexible hook is separated from an inner wall of the insulated shell. The fastener can slide along an axis of the plug slot between a lock position and a release position. The fastener extends to form a blocking piece between the flexible hook and the insulated shell. When the fastener is at the lock position, two sides of the blocking piece individually press against an inner edge of the second opening and the flexible hook. When the fastener is at the release position, the blocking pieces corresponds to the first opening.

11 Claims, 16 Drawing Sheets

OPTICAL FIBER CONNECTOR SOCKET

BACKGROUND OF THE INVENTION

1. Field of the Invention

The present invention relates to an optical fiber connector socket and, in particular, to an optical fiber connector socket equipped with a fastener.

2. Description of Related Art

The optical fiber connector socket is used for the plugging connection of an optical fiber connector plug. An ordinary configuration is to dispose several fiber connector sockets on a base plate in order to arrange the following cable layout. The traditional optical fiber connector socket is provided with a hook therein to hook and connect the optical fiber connector plug. In this way, the optical fiber connector plug can be prevented from disconnecting from the optical fiber connector socket. However, the holding force of the hook is not sufficient and then the optical fiber connector plug is likely to loosen and disconnect caused by a careless touch. Also, when the optical fiber connector plug has a loose connection with the optical fiber connector socket, the former does not probably drop off from the latter. As a result, the worker has to check a large amount of optical fiber connector plugs one by one to identify the failed one.

In view of foregoing, the inventor pays special attention to the above existing technology and researches with the application of related theory to overcome the above disadvantages regarding the above related art, which becomes the goal of the inventor's improvement.

SUMMARY OF THE INVENTION

The main objective of the present invention is to provide an optical fiber connector socket equipped with a fastener.

To achieve the above objective, the present invention provides an optical fiber connector socket, which comprises an insulated shell and a fastener. The insulated shell is provided with a plug slot. A first opening and a second opening communicating with the first opening are formed on each of two opposite sidewalls of the plug slot. A first flexible hook is disposed in the plug slot and corresponds to the second opening on the each of the two opposite sidewalls. The first flexible hook is disposed separately from an inner wall of the insulated shell. The fastener is attachedly disposed on an outer wall of the insulated shell and able to slide along an axis of the plug slot between a lock position and a release position. The fastener extends to form a first blocking piece disposed between the first flexible hook and the inner wall of the insulated shell at each of both ends thereof. When the fastener is at the lock position, two sides of the first blocking piece individually press against an inner edge of the second opening and the first flexible hook.

Preferably, in the above-mentioned optical fiber connector socket, the first openings and the second openings are long-shaped holes; one end of each of the second openings communicates with a middle section of the adjacent first opening.

Preferably, in the above-mentioned optical fiber connector socket, the fastener comprises a cover shell and two first extended arms. The cover shell is disposed covering the insulated shell. Each of the two first extended arms connects the cover shell and the corresponding first blocking piece.

Preferably, in the above-mentioned optical fiber connector socket, when the fastener is at the release position, each of the first blocking pieces corresponds to the position of the corresponding first opening.

Preferably, in the above-mentioned optical fiber connector socket, the contour of the each of the two first extended arms corresponds to that of the second opening.

Preferably, in the above-mentioned optical fiber connector socket, the each of the two first extended arms passes through the corresponding second opening into the insulated shell.

Preferably, in the above-mentioned optical fiber connector socket, the each of the two first extended arms is able to move longitudinally with respect to and inside the corresponding second opening.

Preferably, in the above-mentioned optical fiber connector socket, a pair of opposite positioning hooks are disposed protruding from an external sidewall of the insulated shell. Each of the opposite positioning hooks forms a stop plane at a tip thereof and forms a stop ramp from the stop plane toward a bottom thereof.

To achieve the above objective, the present invention provides another optical fiber connector socket, which comprises an insulated shell and a fastener. The insulated shell is provided with two plug slots. The two plug slots are disposed in parallel and between two opposite sidewalls of the insulated shell. A narrow slot and a connecting slot which communicates with the two plug slots and penetrates through the narrow slot are formed between the two plug slots. A first opening and a second opening communicating with the first opening are formed on each of two opposite sidewalls. A first flexible hook configured corresponding to the second opening and a second flexible hook configured corresponding to the connecting slot are disposed in each of the two plug slots. Each of the first flexible hooks and each of the second flexible hooks are individually disposed separately from an adjacent inner wall of the corresponding plug slot. The fastener comprises a cover shell attachedly disposed on an outer wall of the insulated shell and a linking piece disposed in the narrow slot and connected to the cover shell. The cover shell extends through the second openings to form two first blocking pieces each disposed between the corresponding first flexible hook and an inner wall of the insulated shell. The linking piece extends through the connecting slot to form two second blocking pieces each into the corresponding plug slot. Each of the two second blocking pieces is disposed between the corresponding second flexible hook and the inner wall of the insulated shell. The fastener can slide along axes of the plug slots between a lock position and a release position. When the fastener is at the lock position, two sides of each of the first blocking pieces individually press against an inner edge of the corresponding second opening and the corresponding first flexible hook, and two sides of each of the second blocking pieces individually press against an edge of the connecting slot and the corresponding second flexible hook.

Preferably, in the above-mentioned optical fiber connector socket, the first openings and the second openings are long-shaped holes; one end of each of the second openings communicates with a middle section of the adjacent first opening.

Preferably, in the above-mentioned optical fiber connector socket, the fastener comprises two first extended arms each connected between the corresponding first blocking pieces and the cover shell.

Preferably, in the above-mentioned optical fiber connector socket, when the fastener is at the release position, each of the first blocking pieces corresponds to the position of the corresponding first opening.

Preferably, in the above-mentioned optical fiber connector socket, the contour of each of the two first extended arms corresponds to that of the second opening.

Preferably, in the above-mentioned optical fiber connector socket, each of the two first extended arms passes through the corresponding second opening into the insulated shell.

Preferably, in the above-mentioned optical fiber connector socket, each of the two first extended arms is able to move longitudinally with respect to and inside the corresponding second opening.

Preferably, in the above-mentioned optical fiber connector socket, the fastener comprises two second extended arms each connected between the corresponding second blocking piece and the linking piece.

Preferably, in the above-mentioned optical fiber connector socket, each of the two second extended arms passes through the connecting slot into the corresponding plug slot.

Preferably, in the above-mentioned optical fiber connector socket, each of the two second extended arms is able to move longitudinally with respect to and inside the connecting slot.

Preferably, in the above-mentioned optical fiber connector socket, a pair of opposite positioning hooks are disposed protruding from an external sidewall of the insulated shell. Each of the opposite positioning hooks forms a stop plane at a tip thereof and forms a stop ramp from the stop plane toward a bottom thereof.

The optical fiber connector socket of the present invention can use a fastener to fix an optical fiber connector plug connected to itself. Compared with the prior art, the present invention provides a connection between the optical fiber connector socket and the optical fiber connector plug by means of the fastener, which is not easy to loosen. In addition, the location of the optical fiber connector plug which is loose can be obviously and easily identified via the position of the fastener.

DETAILED DESCRIPTION OF THE INVENTION

Figure 1:
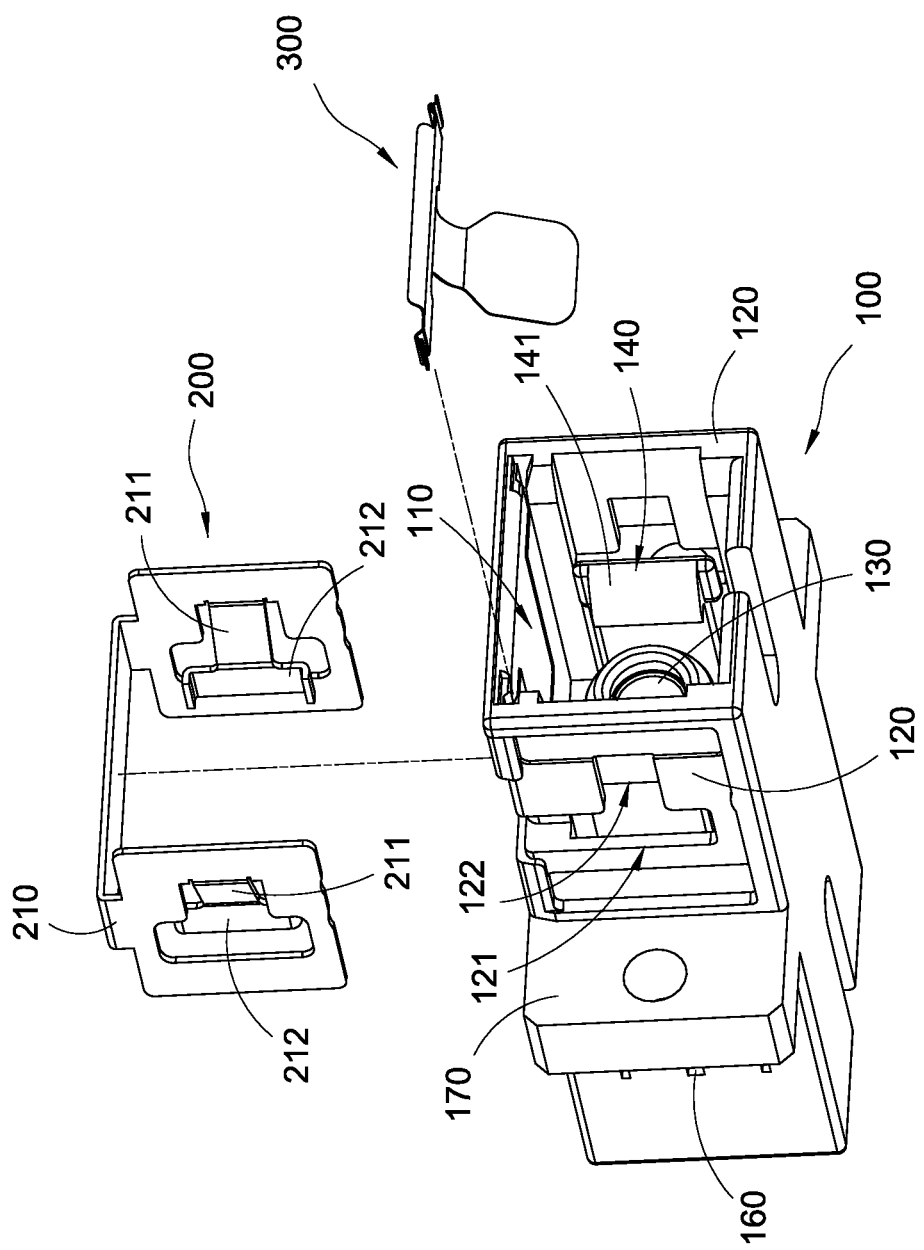
FIG. 1 is a perspective exploded schematic view of the optical fiber connector socket according to the first embodiment of the present invention.
Figure 2:
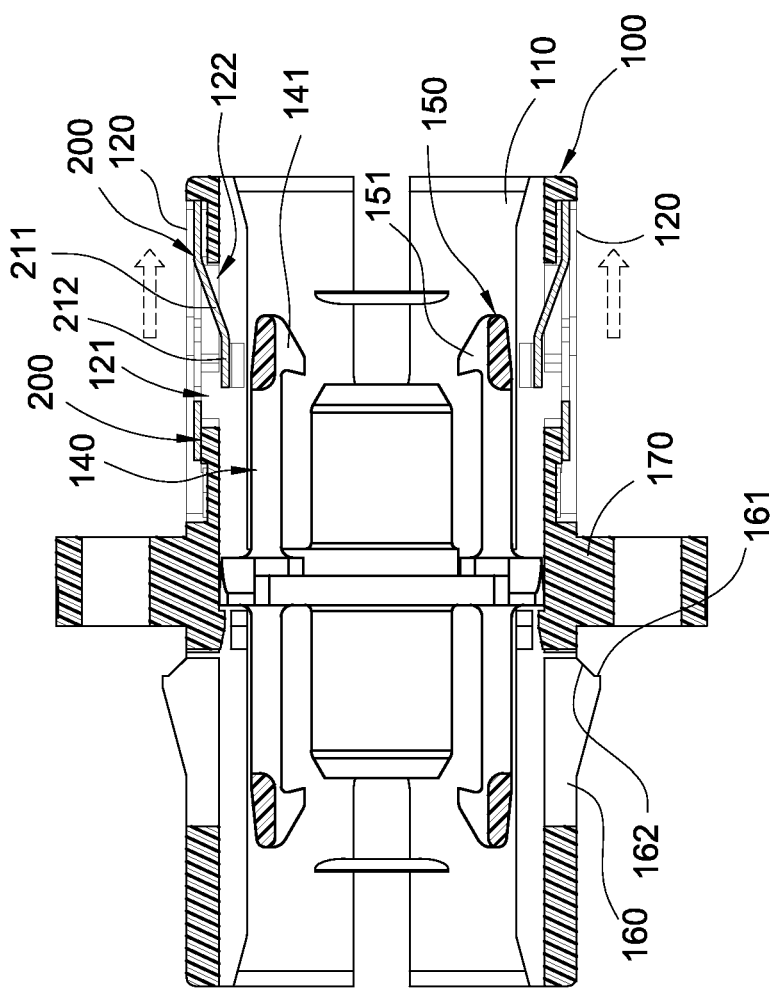
FIG. 2 is a cross-sectional view of the optical fiber connector socket according to the first embodiment of the present invention.

Please refer to FIGS. 1 and 2, which show an optical fiber connector socket according to the first embodiment the present invention. The optical fiber connector socket comprises an insulated shell 100 and a fastener 200.

The insulated shell 100 has a parallelepiped-like shape. A plug slot 110 is formed on an end sidewall of the insulated shell 100. On each of two opposite sidewalls 120 of the plug slot 110, a first opening 121 and a second opening 122 communicating with the first opening 121 are formed. In the current embodiment, the first openings 121 and the second openings 122 are long-shaped holes; one end of each of the second openings 122 communicates with a middle section of the adjacent first opening 121.

A wire tube 130 is disposed longitudinally in the plug slot 110 and allows a fiber line to pass through therein. A pair of first flexible hooks 140/150 are disposed in the plug slot 110 and are individually disposed on both sides of the wire tube 130. Each of the first flexible hooks 140/150 extends longitudinally from the bottom of the plug slot 110 and is disposed separately from an inner wall of the adjacent sidewall 120. An end of the each of the first flexible hooks 140 and 150 protrudes laterally to form hook parts 141 and 151, respectively, which is disposed corresponding to the second opening 122 of the adjacent sidewall 120. Thus, the hook parts 141 and 151 can move back into the second opening 122 to allow the first flexible hooks 140 and 150 to be bent and deviated. A pair of opposite positioning hooks 160 are disposed protruding from an external sidewall of the insulated shell 100 and a pair of opposite stop walls 170 are disposed corresponding to the positioning hooks 160. Each of the opposite positioning hooks 160 forms a stop plane 161 parallel with and separated from the stop walls 170 at a tip thereof and extends to form a stop ramp 162 from the stop plane 161 toward a bottom thereof; the stop ramp 162 is inclined with the stop plane 161.

The fastener 200 is attachedly disposed on an outer wall of the insulated shell 100. In the current embodiment, the fastener 200 is a cover shell 210 which is a U-shaped metal plate disposed covering the outer wall of the insulated shell 100. Two ends of the cover shell 210 individually cover outer walls of the opposite sidewalls 120 of the plug slot 110. Thus, the fastener 200 is able to slide along an axis of the plug slot 110 on the outer wall of the insulated shell 100, sliding between a lock position and a release position. Each end of the cover shell 210 extends to form a first extended arm 211. The contour of the first extended arm 211 corresponds to that of the second opening 122. The two first extended arms 211 individually pass through the corresponding second opening 122 into the insulated shell 100. When the fastener 200 slides on the insulated shell 100, the first extended arm 211 can move longitudinally with respect to and inside the corresponding second opening 122. A first blocking piece 212 is disposed at an end of the each of the two first extended arms 211 and disposed between the corresponding first flexible hooks 140 and 150 and the inner wall of the insulated shell 100.

The plug slot 110 of the insulated shell 100 is provided with a light shield 300, part of which is connected to the opening edge of the plug slot 110 and shields the wire tube 130. As a result, when the worker checks the optical fiber connector socket of the present invention, the light shield 300 can prevent the worker's eyes from being exposed to and being injured by the light beam of high energy delivered by the optical fiber.

Figure 3:
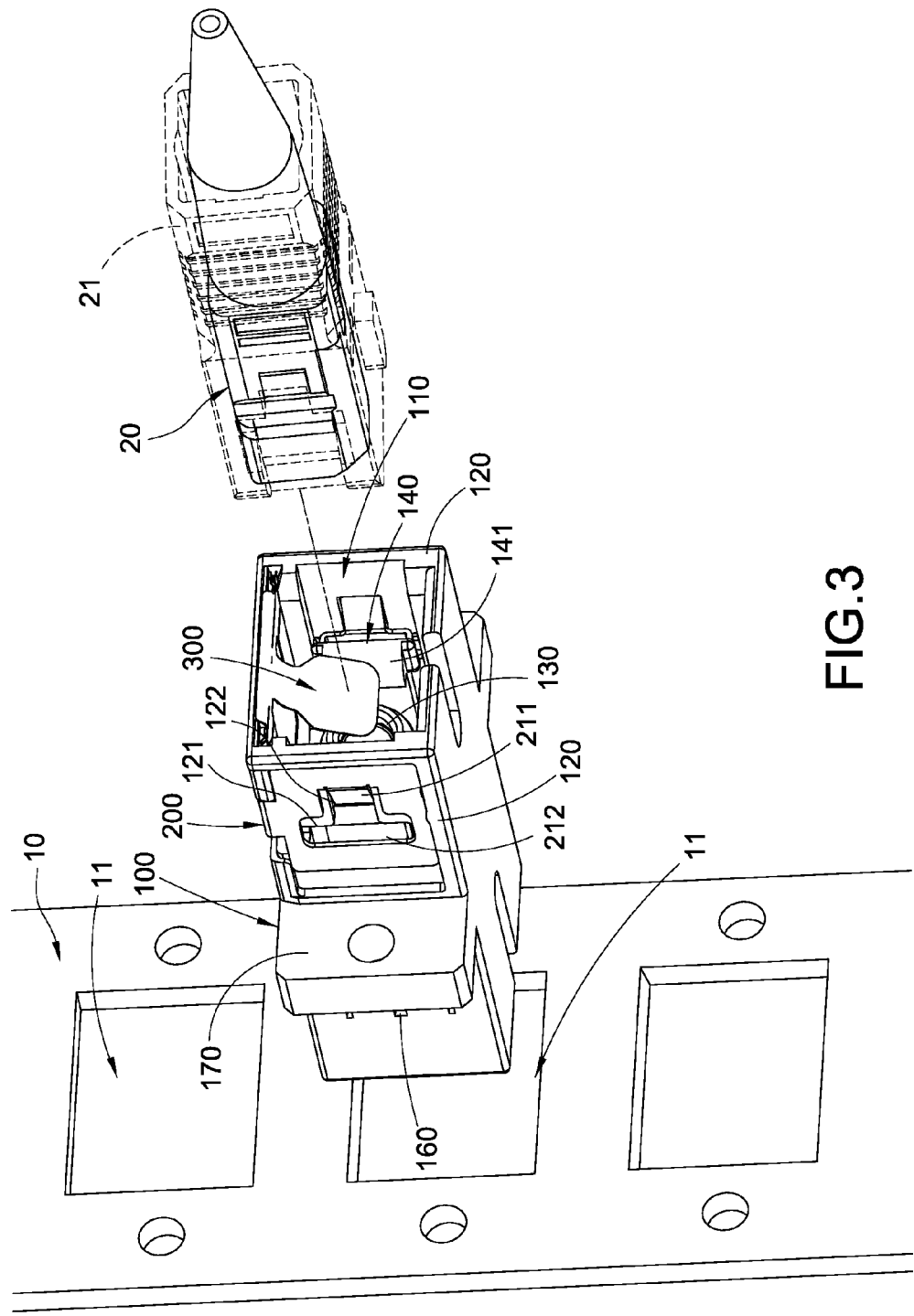
FIG. 3 is an installation schematic view of the optical fiber connector socket according to the first embodiment of the present invention.
Figure 4:
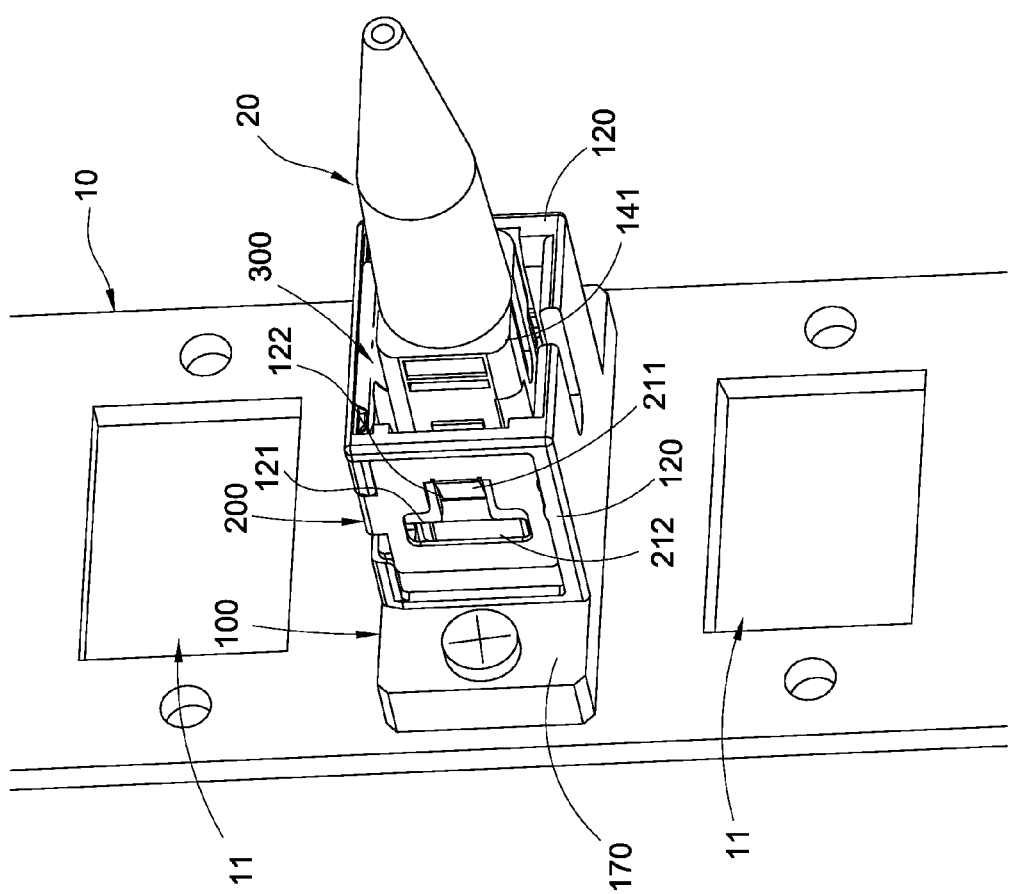
FIG. 4 is another installation schematic view of the optical fiber connector socket according to the first embodiment of the present invention.

Please refer to FIGS. 3 and 4. The optical fiber connector socket of the present invention is disposed on a base plate 10 for the plugging connection of an optical fiber connector plug 20. For a simply explanation of the connection relation between the optical fiber connector socket of the present invention and the optical fiber connector plug 20, the housing 21 of the optical fiber connector plug 20 in the following figures is not shown. In the current embodiment, the base plate 10 is preferably provided with a plurality of through openings 11 for the disposition of optical fiber connector sockets. The insulated shell 100 of the optical fiber connector socket passes through one of the through openings 11 and the opening edge of the through opening 11 is clamped by the positioning hooks 160 and the corresponding stop walls 170. Preferably, the opening edge of the through opening 11 is constrained between the stop plane 161 and the stop wall 170 such that the optical fiber connector socket of the present invention is connected to the base plate 10. The stop ramp 162 of the positioning hook 160 presses against the opening edge of the through opening 11 such that the opening edge of the through opening 11 is held firm and stationary by the stop ramp 162 and the corresponding stop wall 170.

Figure 5:
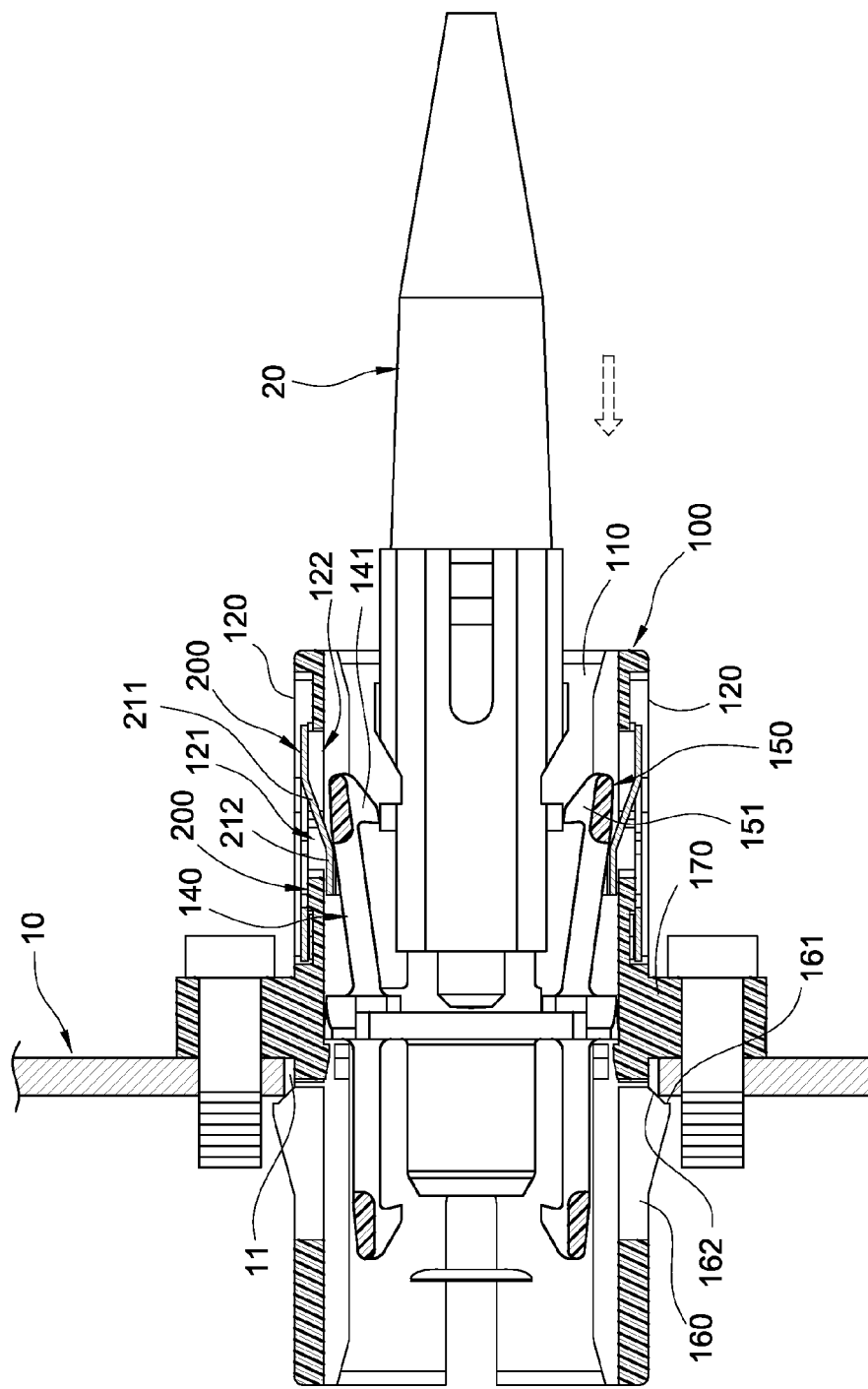
FIG. 5 is a schematic view of the optical fiber connector socket according to the first embodiment of the present invention with the fastener at the release position.

Please refer to FIG. 5. When the fastener 200 is at the release position, the first blocking piece 212 is corresponding to the position of the first opening 121 and staggers the hook parts 141 or 151 of the first flexible hook 140 or 150. When the first flexible hook 140 or 150 is pushed outwards, the hook part 141 or 151 is allowed to move back towards the inner wall of the plug slot 110. Thus, when the optical fiber connector socket of the present invention is plugged and connected by the optical fiber connector plug 20, the optical fiber connector plug 20 can push the first flexible hook 140 or 150 and the light shield 300 outwards to plug into the plug slot 110.

Figure 6:
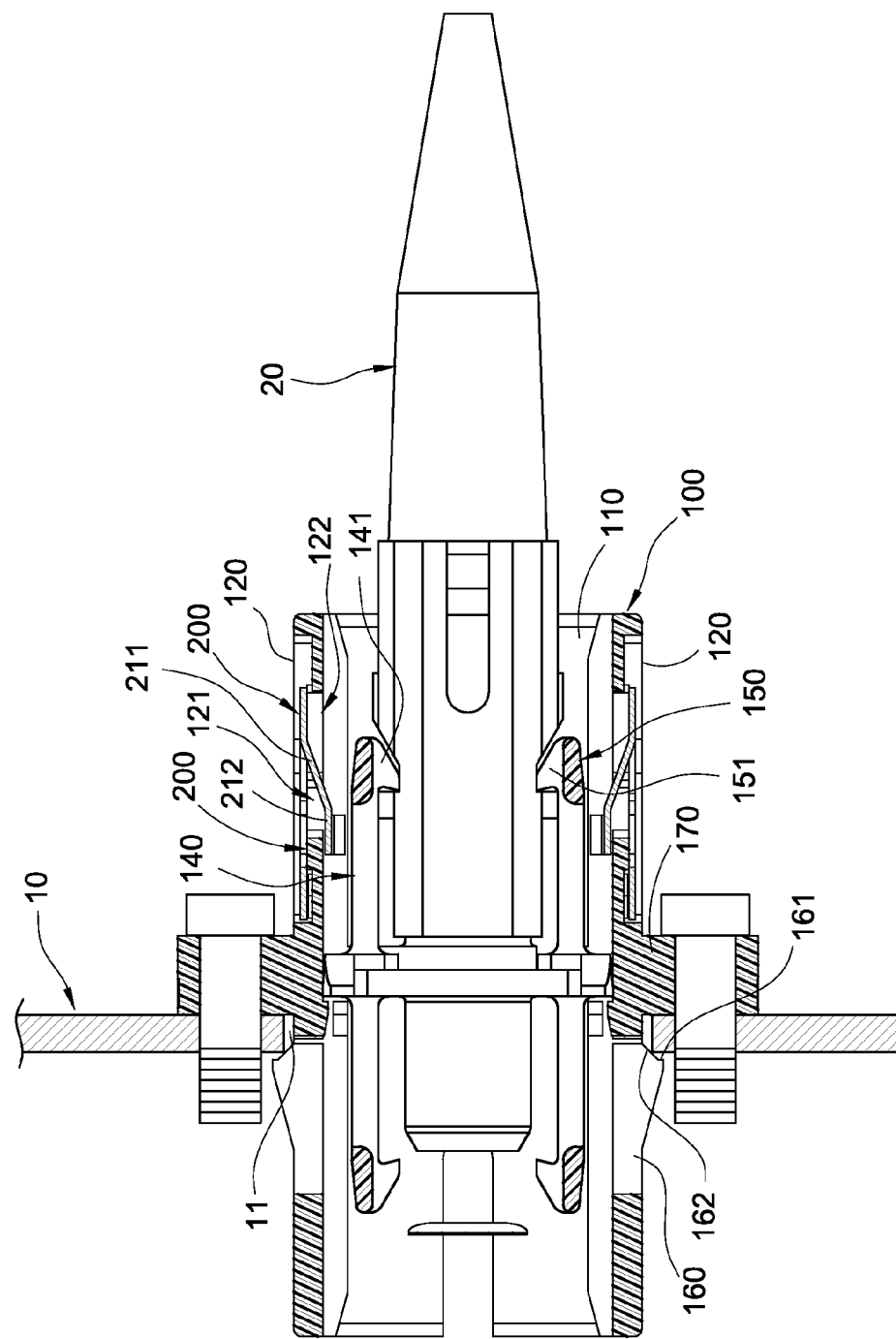
FIG. 6 is a schematic view of the plugging connection of the optical fiber connector socket according to the first embodiment of the present invention.

Please refer to FIG. 6. When the optical fiber connector plug 20 is plugged firmly, the first flexible hook 140 or 150 is replaced and the hook part 141 or 151 snaps into and fixes the optical fiber connector plug 20.

Figure 7:
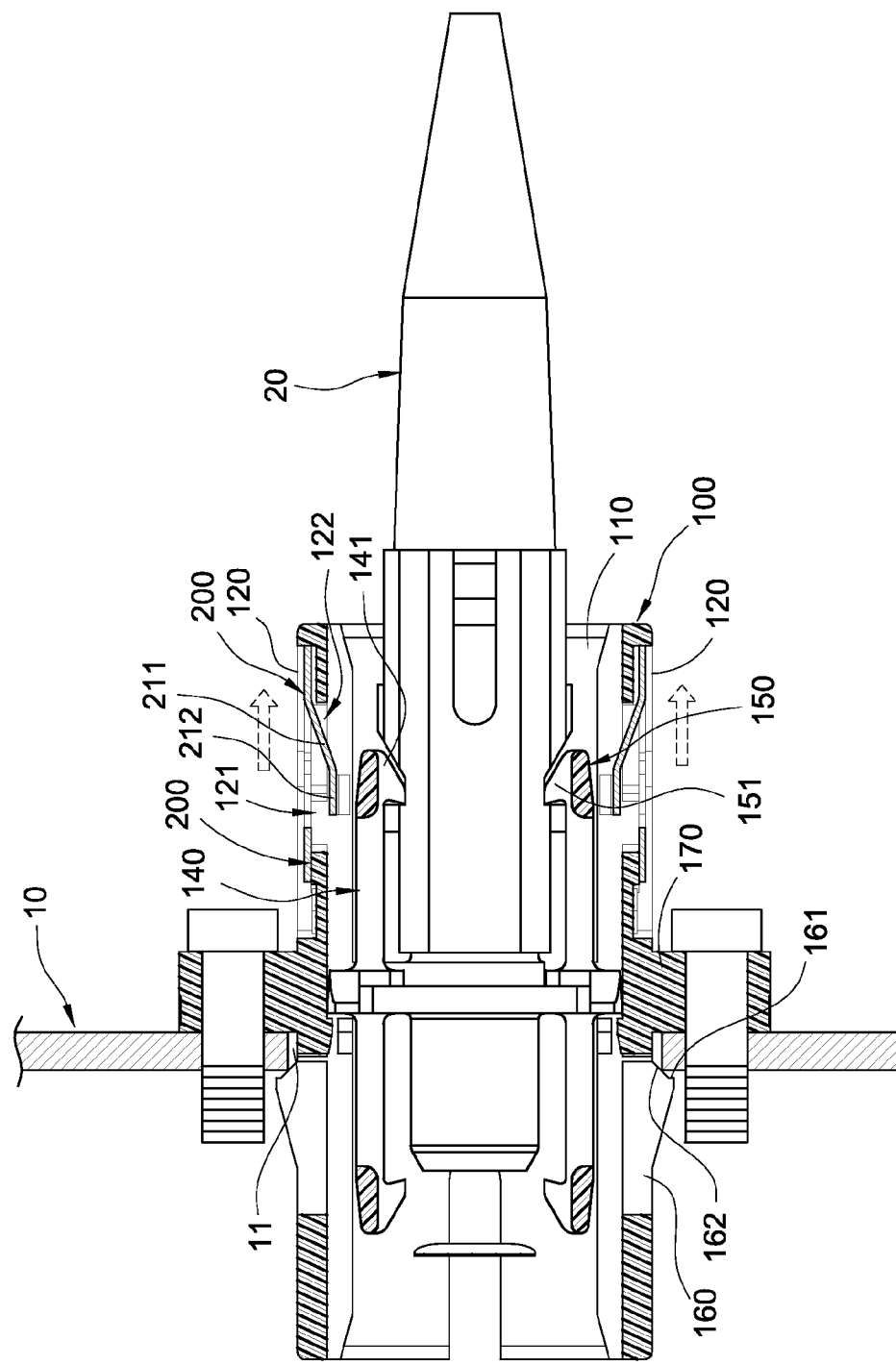
FIG. 7 is a schematic view of the optical fiber connector socket according to the first embodiment of the present invention with the fastener at the lock position.

Please refer to FIG. 7. When the fastener 200 is at the lock position, two sides of the first blocking piece 212 individually press against the inner edge of the second opening 122 and the outside of the hook part 141 or 151 of the first flexible hook 140 of 150. Thus, the hook part 141 or 151 cannot be pushed outwards and the optical fiber connector plug 20 is held firmly in the plug slot 110.

Figure 8:
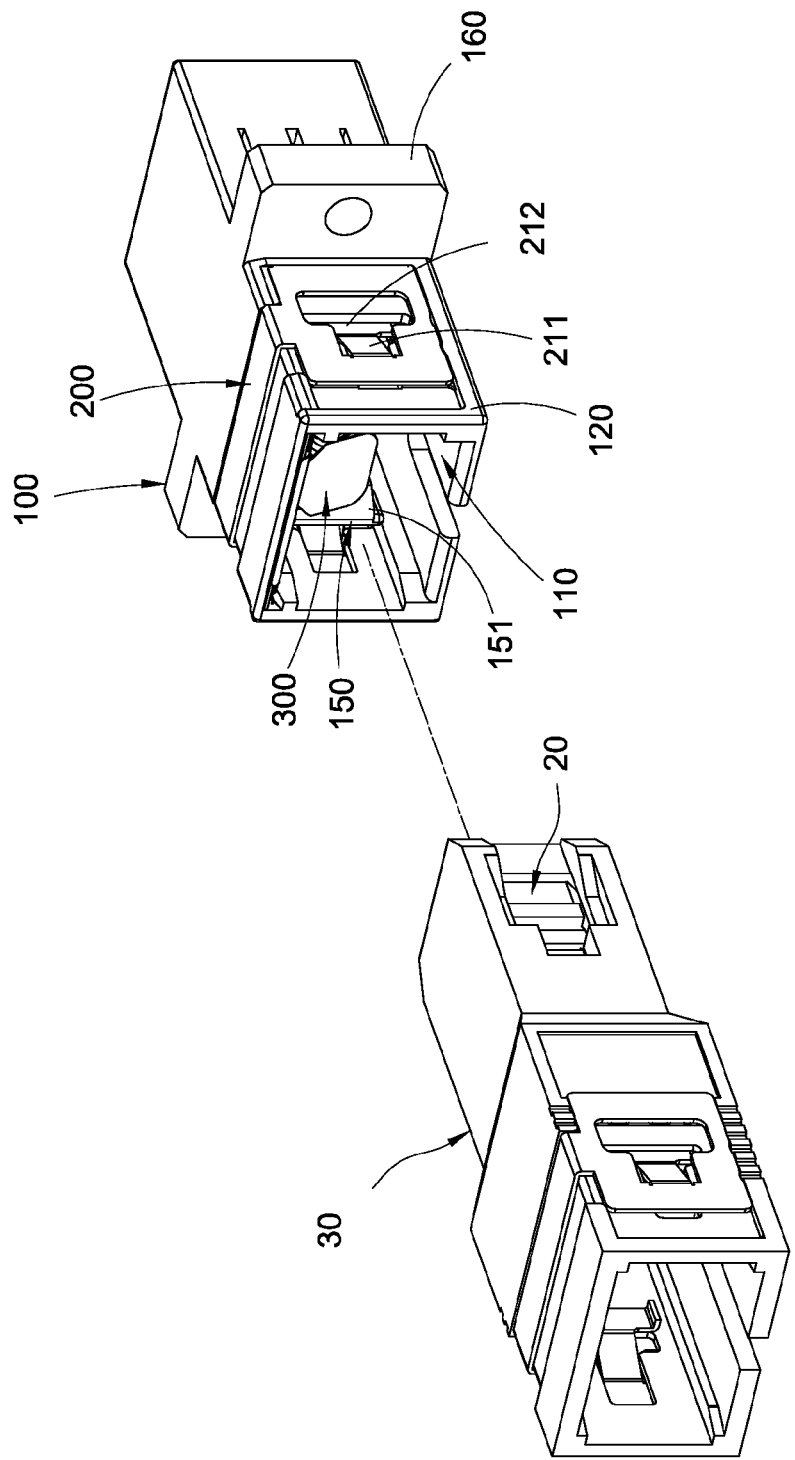
FIG. 8 is a schematic view of the optical fiber connector socket according to the first embodiment of the present invention in use.

Please refer to FIG. 8. The optical fiber connector socket of the present invention can also be used for the plugging connection of an attenuator 30. Through such an adaptation, the above-mentioned optical fiber connector plug 20 can transform the strength of the signal transmitted therein.

Figure 9:
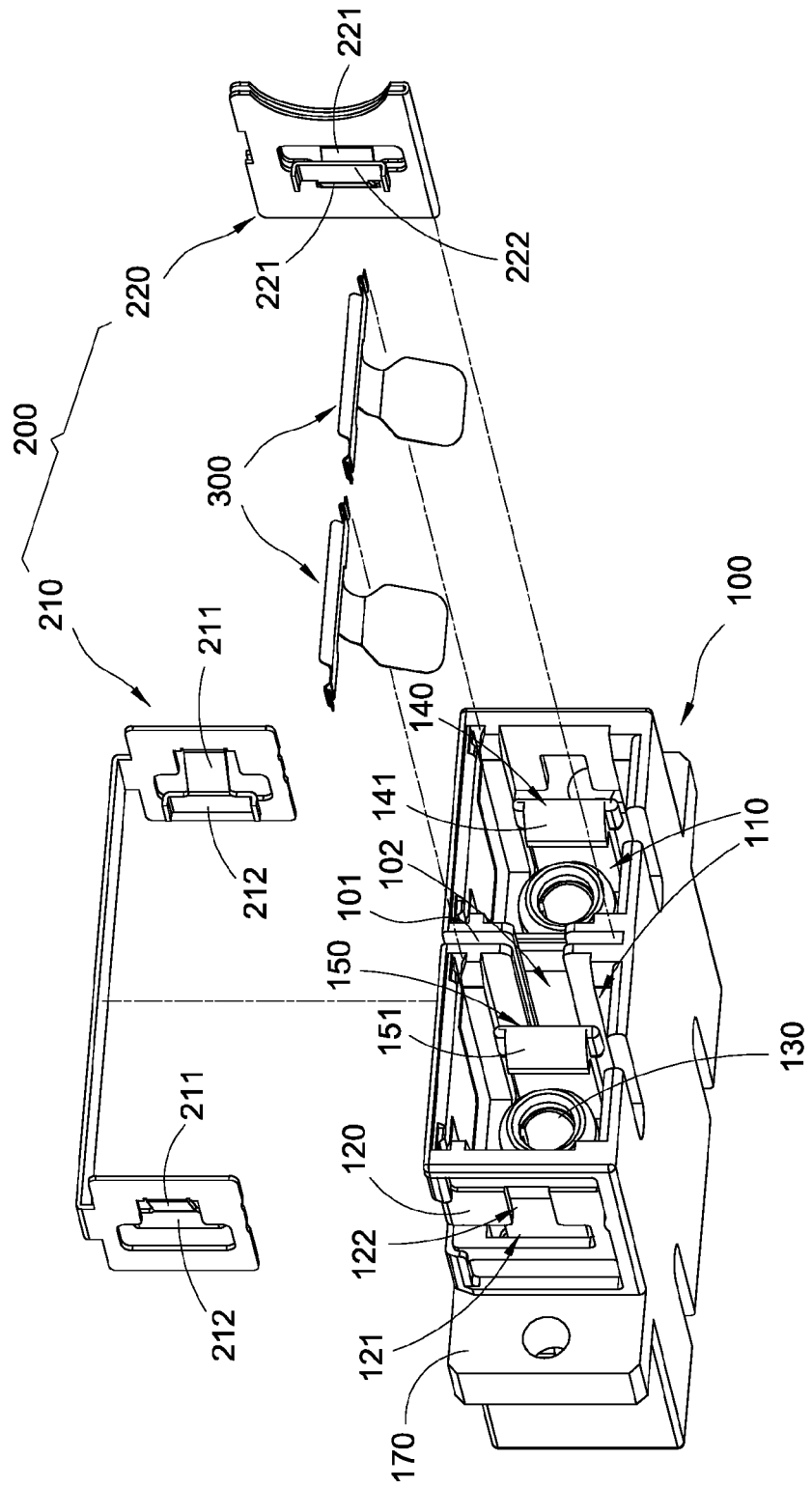
FIG. 9 is a perspective exploded schematic view of the optical fiber connector socket according to the second embodiment of the present invention.
Figure 10:
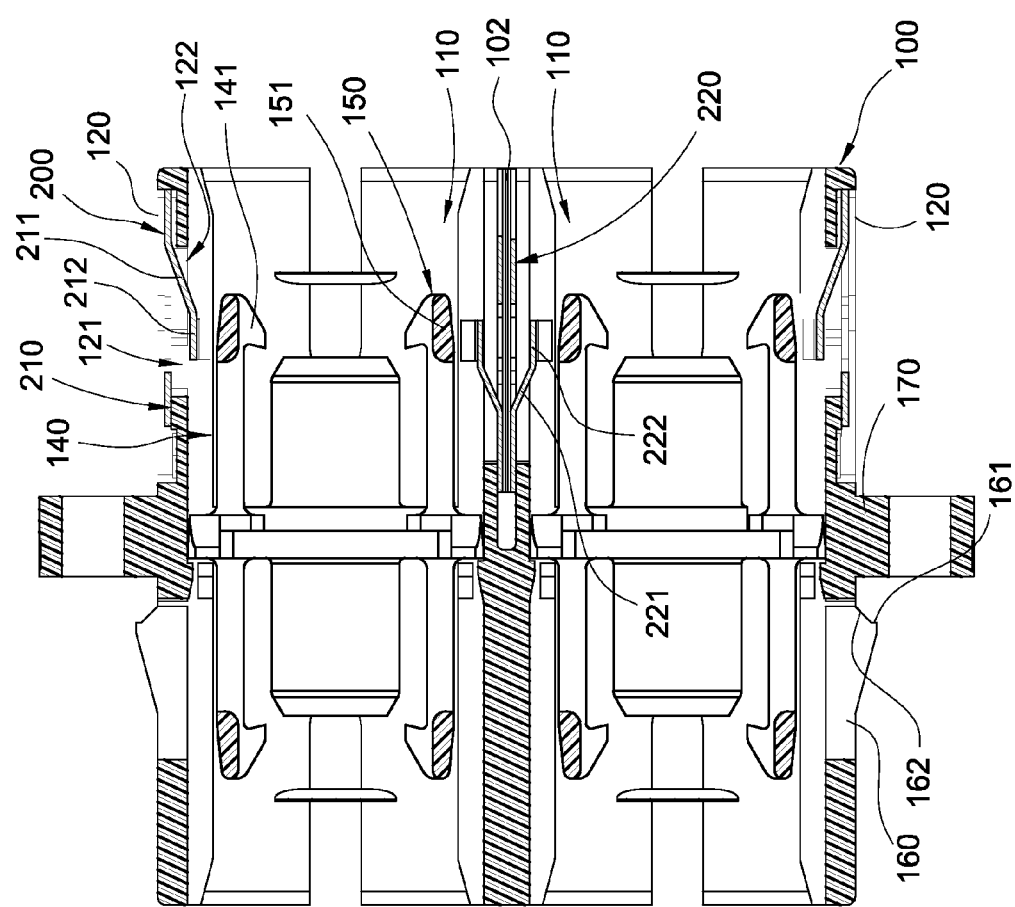
FIG. 10 is a cross-sectional view of the optical fiber connector socket according to the second embodiment of the present invention.

Please refer FIGS. 9 and 10, which show an optical fiber connector socket according to the second embodiment the present invention. The optical fiber connector socket comprises an insulated shell 100 and a fastener 200.

The insulated shell 100 has a parallelepiped-like shape. Two plug slots 110 are formed on an end sidewall of the insulated shell 100. The two plug slots 110 are disposed in parallel and between two opposite sidewalls 120 of the insulated shell 100. A narrow slot 101 and a connecting slot 102 which communicates with the two plug slots 110 and penetrates through the narrow slot 101 are formed between the two plug slots 110. A first opening 121 and a second opening 122 communicating with the first opening 121 are formed on each of two opposite sidewalls 120. In the current embodiment, the first openings 121 and the second openings 122 are long-shaped holes; one end of each of the second openings 122 communicates with a middle section of the adjacent first opening 121.

A wire tube 130 is disposed longitudinally in each of the two plug slots 110 and allows a fiber line to pass through therein. A first flexible hook 140 and a second flexible hook 150 are disposed on both sides of the wire tube 130 and opposite from each other in each of the two plug slots 110. Each of the first and second flexible hooks 140/150 extends longitudinally from the bottom of the plug slot 110 and is disposed separately from an inner wall of the corresponding plug slot 110. An end of the first flexible hook 140 protrudes laterally to form a hook part 141 which is disposed corresponding to the second opening 122 of the adjacent sidewall 120. Thus, the hook part 141 can move back into the second opening 122 to allow the first flexible hook 140 to be bent and deviated. The second flexible hook 150 is disposed separately from an inner wall of the corresponding plug slot 110. An end of the second flexible hook 150 protrudes laterally to form a hook part 151 which is disposed corresponding to the connecting slot 102. A pair of opposite positioning hooks 160 are disposed protruding from an external sidewall of the insulated shell 100 and a pair of opposite stop walls 170 are disposed corresponding to positioning hooks 160 Each of the opposite positioning hooks 160 forms a stop plane 161 parallel with and separated from the stop walls 170 at a tip thereof and extends to form a stop ramp 162 from the stop plane 161 toward a bottom thereof; the stop ramp 162 is inclined with the stop plane 161.

The fastener 200 is attachedly disposed on an outer wall of the insulated shell 100. In the current embodiment, the fastener 200 comprises a cover shell 210 and a linking piece 220. The cover shell 210 is a U-shaped metal plate disposed covering the outer wall of the insulated shell 100. Two ends of the cover shell 210 individually cover outer walls of the two opposite sidewalls 120. The linking piece 220 which is disposed in the narrow slot 101 and snapped into the cover shell 210 can be moved by the cover shell 210. Thus, the fastener 200 is able to slide along axes of the plug slots 110 on the outer wall of the insulated shell 100, sliding between a lock position and a release position. Each end of the cover shell 210 extends to form a first extended arm 211. The contour of the first extended arm 211 corresponds to that of the second opening 122. The two first extended arms 211 individually pass through the corresponding second opening 122 into the corresponding plug slot 110 of the insulated shell 100. The linking piece 220 extends through the connecting slot 102 to form two second extended arms 221 each into the corresponding plug slot 110. When the fastener 200 slides on the insulated shell 100, the two first extended arms 211 can move longitudinally with respect to and inside the corresponding second opening 122. Each of the two second extended arms 221 can move longitudinally with respect to and inside the connecting slot 102. A first and a second blocking pieces 212/222 are disposed at the ends of the first and the second extended arms 211/222, respectively. Each of the two first blocking pieces 212 is disposed between the corresponding first flexible hook 140 and an inner wall of the insulated shell 100; each of the two second blocking pieces 222 is disposed between the corresponding second flexible hook 150 and the inner wall of the insulated shell 100.

The plug slots 110 of the insulated shell 100 are provided with a light shield 300, part of which is connected to the opening edges of the plug slots 110 and shields the wire tubes 130. As a result, when the worker checks the optical fiber connector socket of the present invention, the light shield 300 can prevent the worker's eyes from being exposed to and injured by the light beams of high energy delivered by the optical fibers.

Figure 11:
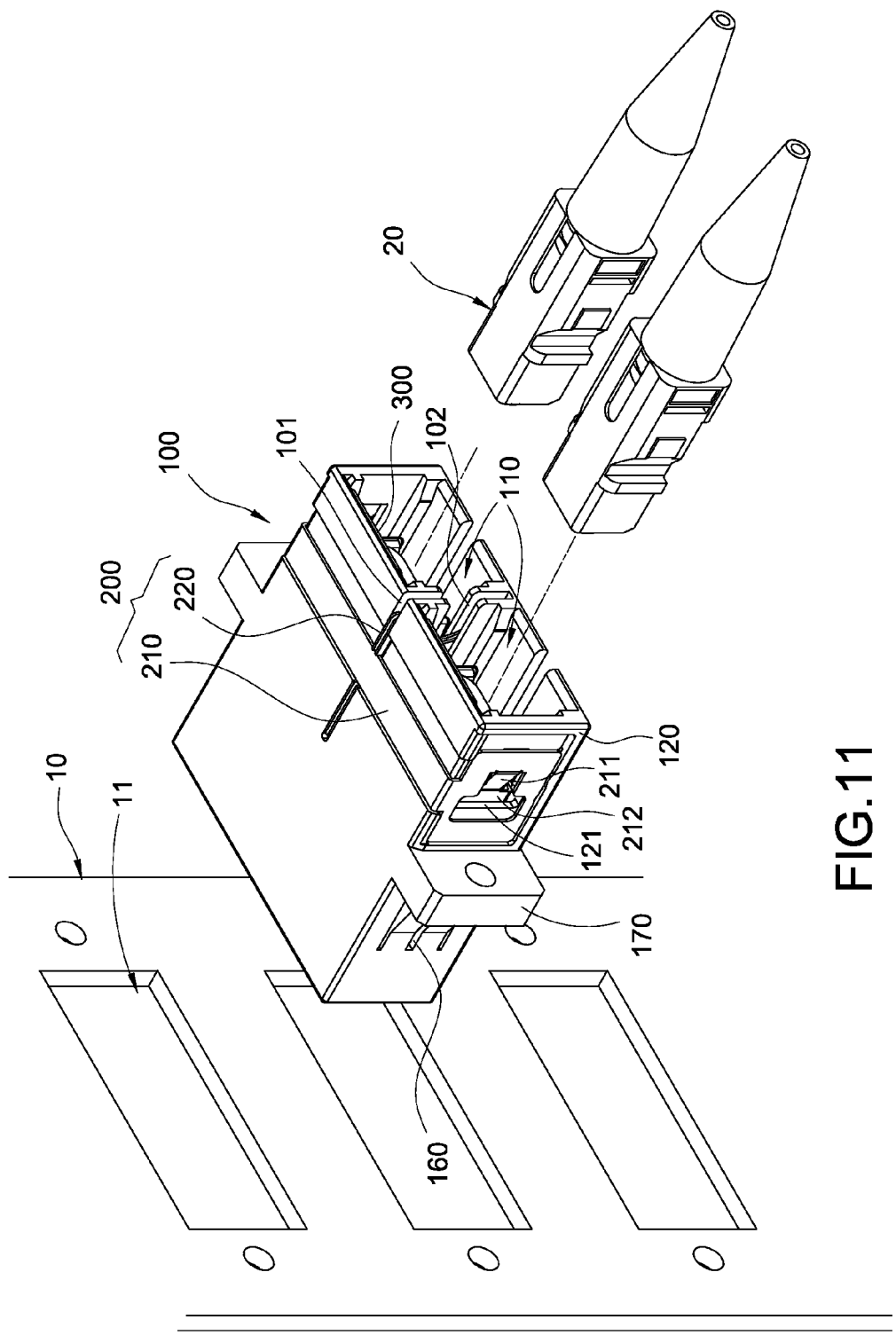
FIG. 11 is an installation schematic view of the optical fiber connector socket according to the second embodiment of the present invention.
Figure 12:
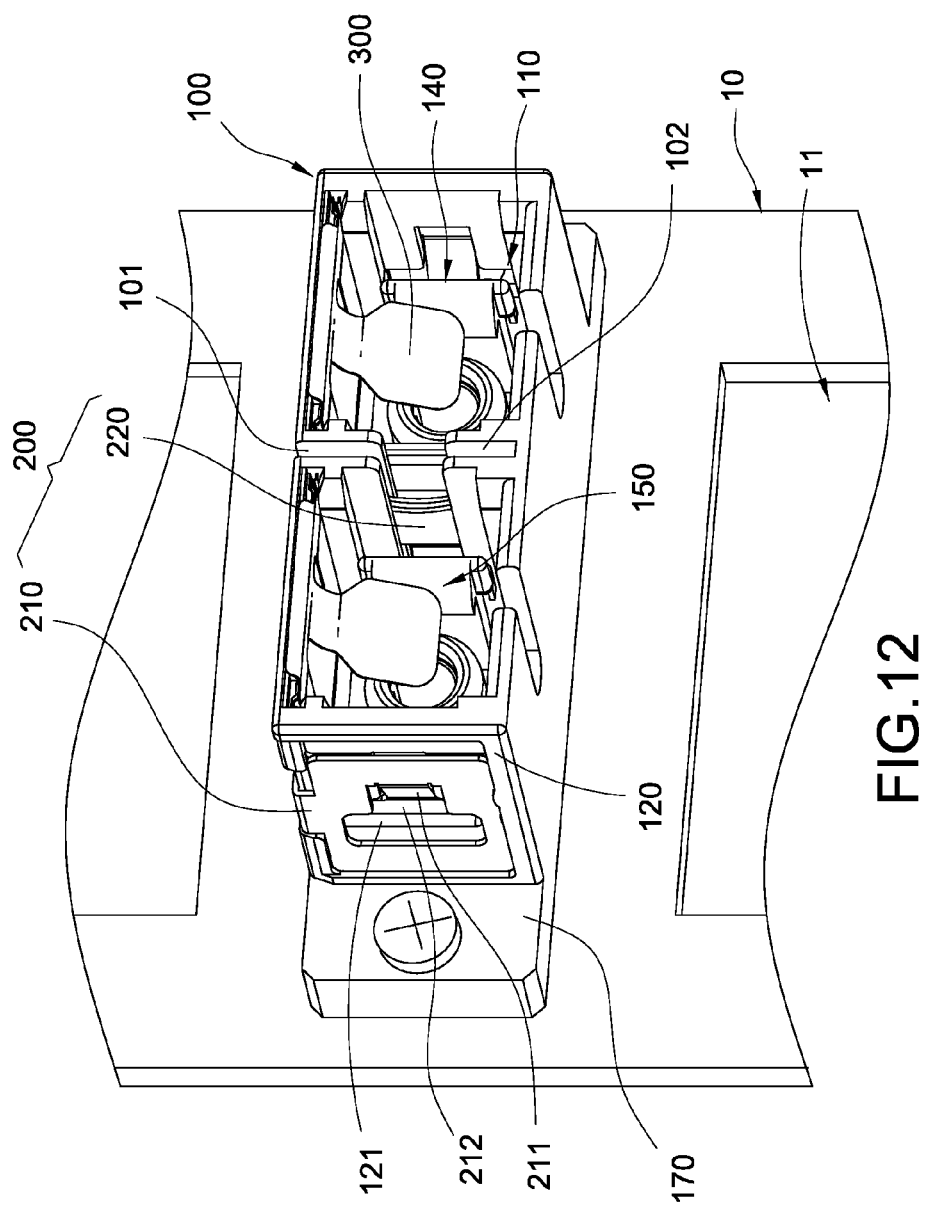
FIG. 12 is another installation schematic view of the optical fiber connector socket according to the second embodiment of the present invention.

Please refer to FIGS. 11 and 12. The optical fiber connector socket of the present invention is disposed on a base plate 10 for the plugging connection of optical fiber connector plugs 20. For a simply explanation of the connection relation between the optical fiber connector socket of the present invention and the optical fiber connector plugs 20, the housing 21 of the optical fiber connector plugs 20 in the following figures is not shown. In the current embodiment, the base plate 10 is preferably provided with a plurality of through openings 11 for the disposition of optical fiber connector sockets. The insulated shell 100 of the optical fiber connector socket passes through one of the through openings 11 and the opening edge of the through opening 11 is clamped by the positioning hooks 160 and the corresponding stop walls 170. Preferably, the opening edge of the through opening 11 is constrained between the stop plane 161 and the stop wall 170 such that the optical fiber connector socket of the present invention is connected to the base plate 10. The stop ramp 162 of the positioning hook 160 presses against the opening edge of the through opening 11 such that the opening edge of the through opening 11 is held firm and stationary by the stop ramp 162 and the corresponding stop wall 170.

Figure 13:
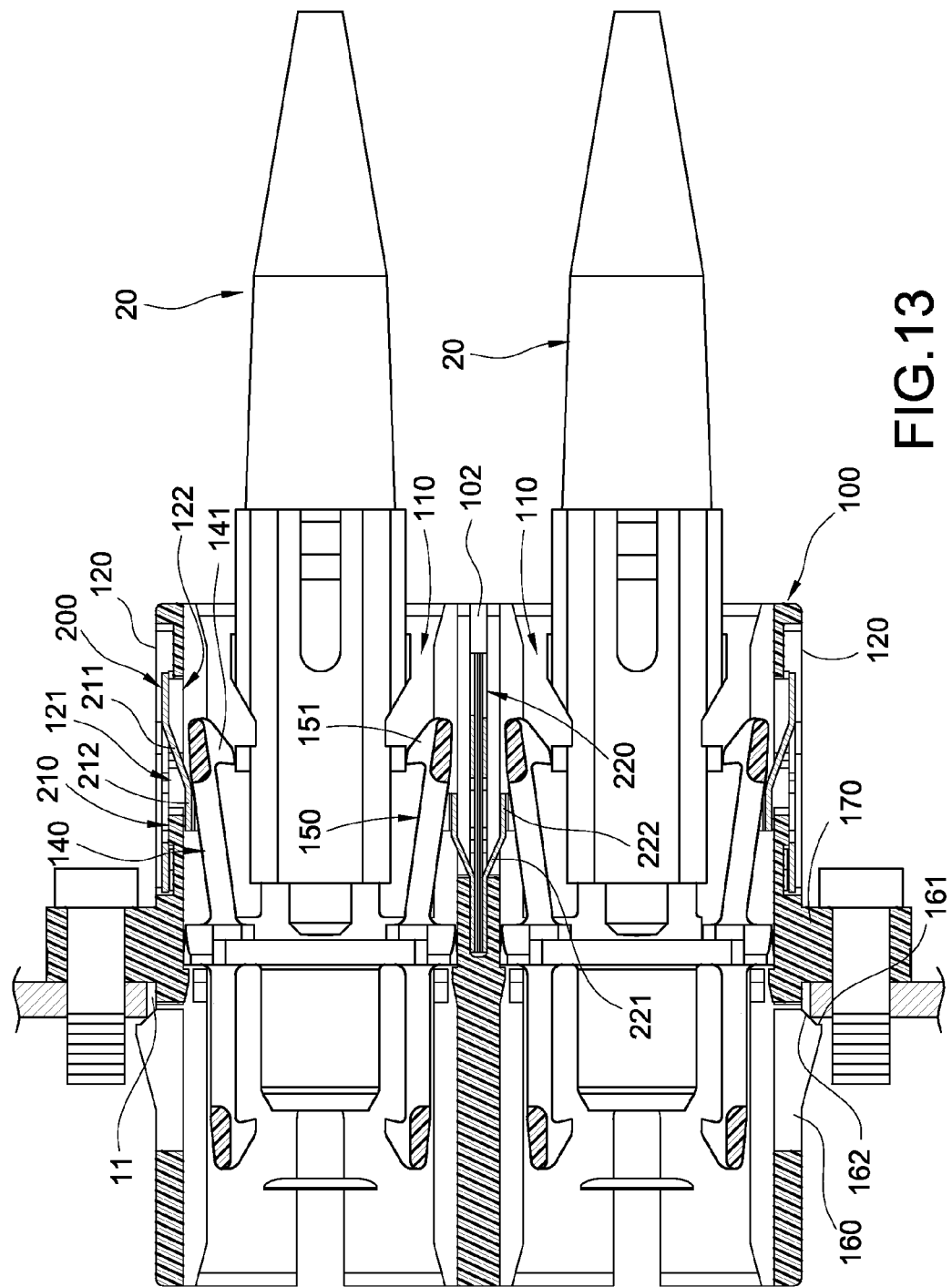
FIG. 13 is a schematic view of the optical fiber connector socket according to the second embodiment of the present invention with the fastener at the release position.

Please refer to FIG. 13. When the fastener 200 is at the release position, the first blocking piece 212 is corresponding to the position of the first opening 121 and staggers the hook part 141 of the first flexible hook 140; the second blocking piece 222 staggers the hook part 151 of the second flexible hook 150. When the first/second flexible hooks 140/150 are pushed outwards, the hook parts 141/151 are allowed to move back towards the inner wall of the plug slot 110. Thus, when the optical fiber connector socket of the present invention is plugged and connected by the optical fiber connector plugs 20, the optical fiber connector plugs 20 can push the first/second flexible hooks 140/150 and the light shield 300 outwards to plug into the plug slots 110.

Figure 14:
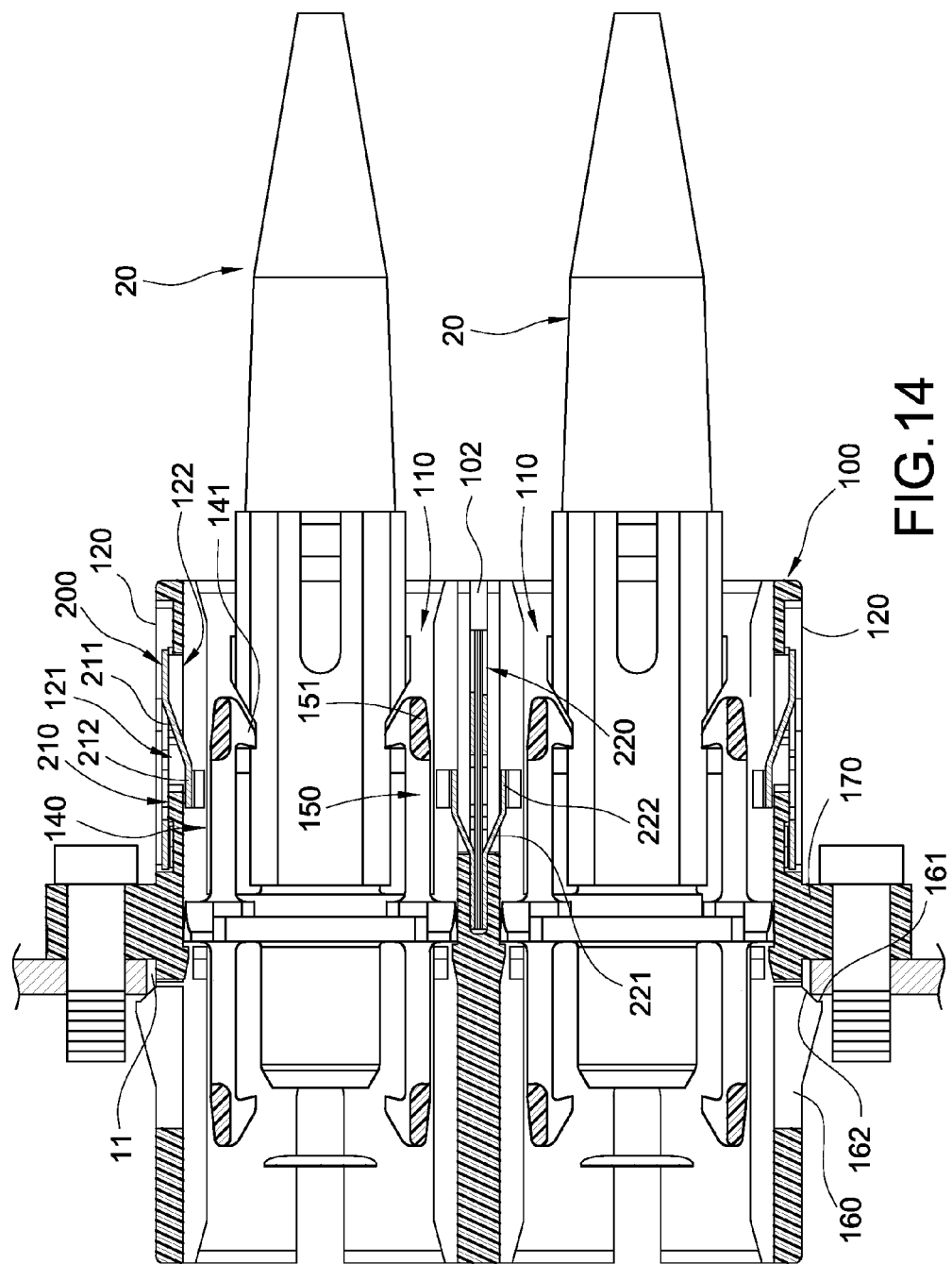
FIG. 14 is a schematic view of the plugging connection of the optical fiber connector socket according to the second embodiment of the present invention.

Please refer to FIG. 14. When the optical fiber connector plugs 20 are plugged firmly, the first/second flexible hooks 140/150 are replaced and the hook parts 141/151 snap into and fix the optical fiber connector plugs 20.

Figure 15:
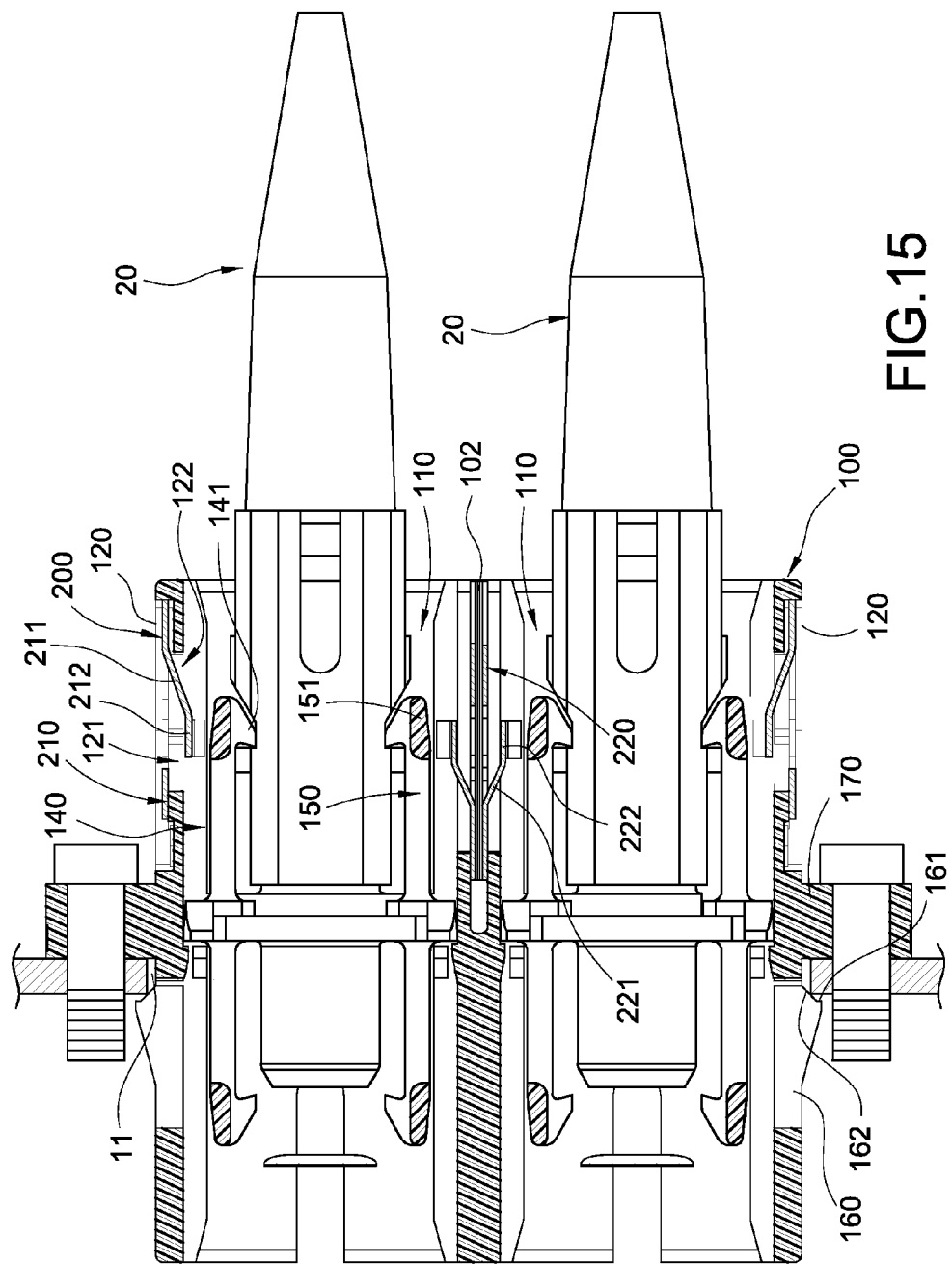
FIG. 15 is a schematic view of the optical fiber connector socket according to the second embodiment of the present invention with the fastener at the lock position.

Please refer to FIG. 15. When the fastener 200 is at the lock position, two sides of the first blocking piece 212 individually press against the inner edge of the second opening 122 and the outside of the hook part 141 of the first flexible hook 140. Also, two sides of the second blocking piece 222 individually press against the edge of the connecting slot 102 and the outside of the hook part 151 of the second flexible hook 150. Thus, the hook parts 141/151 of the first/second flexible hooks 140/150 cannot be pushed outwards and the optical fiber connector plugs 20 are held firmly in the plug slots 110.

Figure 16:
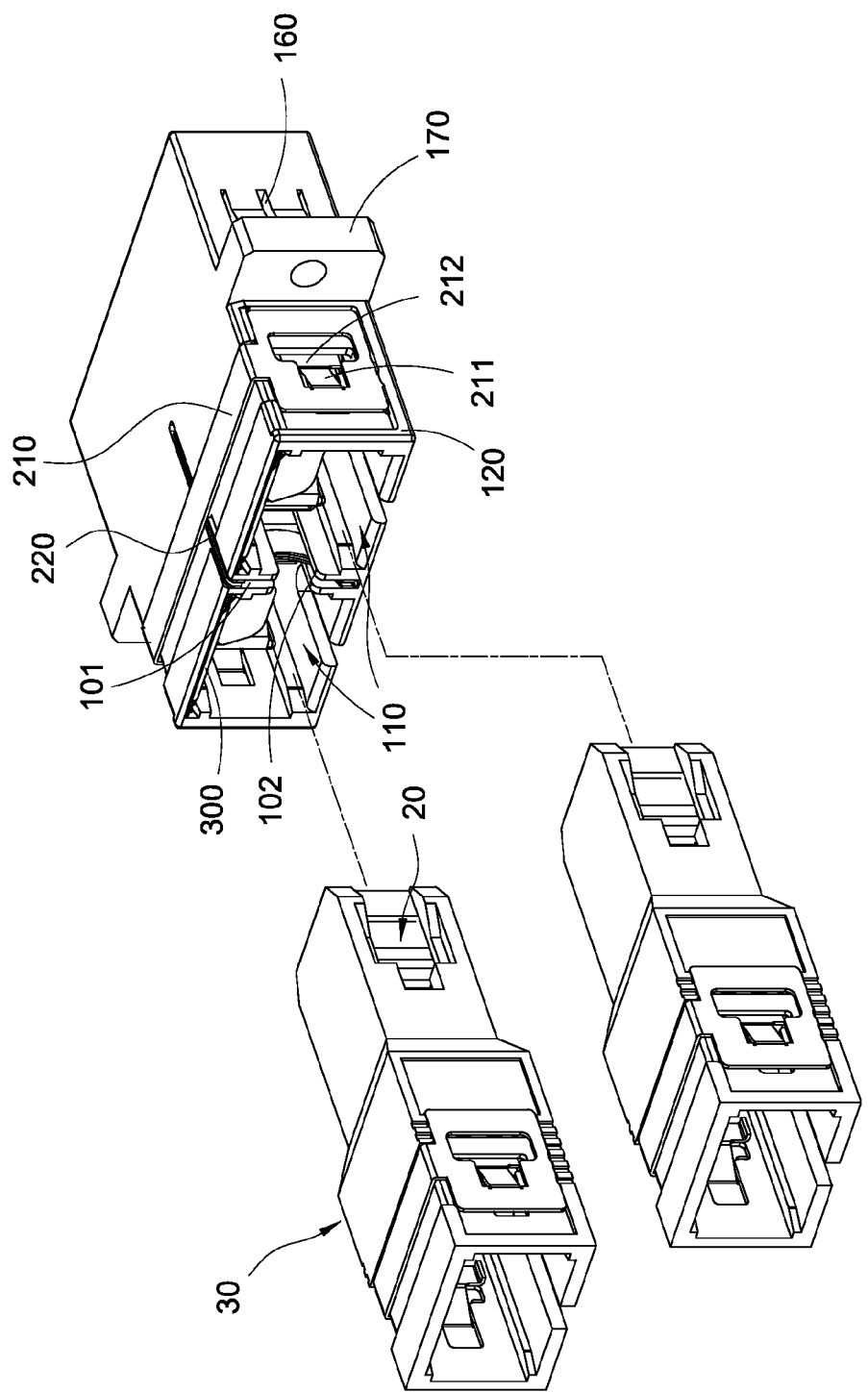
FIG. 16 is a schematic view of the optical fiber connector socket according to the second embodiment of the present invention in use.

Please refer to FIG. 16. The optical fiber connector socket of the present invention can also be used for the plugging connection of attenuators 30. Through such an adaptation, the above-mentioned optical fiber connector plugs 20 can transform the strength of the signal transmitted therein.

The optical fiber connector socket of the present invention can use a fastener 200 to fix an optical fiber connector plug connected to itself. Compared with the prior art, the present invention provides a connection between the optical fiber connector socket and the optical fiber connector plug by means of the fastener, which is not easy to loosen. In addition, the location of the optical fiber connector plug 20 which is loose can be obviously and easily identified via the position of the fastener 200. When an abnormal transmission of the signal is detected, it is only to check the optical fiber connector socket with the fastener 200 at release position first. The embodiments disclosed above are only preferred embodiments of the present invention, but not to limit the present invention. All the equivalent modifications based on the spirit of the present invention should be covered by the scope of the present invention.

What is claimed is:

1. An optical fiber connector socket, comprising:
   an insulated shell (100) provided with a plug slot (110), wherein a first opening (121) and a second opening (122) communicating with the first opening (121) are formed on each of two opposite sidewalls (120) of the plug slot (110), wherein a first flexible hook (140) is disposed in the plug slot (110) and corresponds to the second opening (122) on the each of the two opposite sidewalls (120), wherein the first flexible hook (140) is disposed separately from an inner wall of the insulated shell (100); and
   a fastener (200) attachedly disposed on an outer wall of the insulated shell (100) and able to slide along an axis of the plug slot (110) between a lock position and a release position, wherein the fastener (200) extends to form a first blocking piece (212) disposed between the first flexible hook (140) and the inner wall of the insulated shell (100) at each of both ends thereof,
   wherein when the fastener (200) is at the lock position, two sides of the first blocking piece (212) individually press against an inner edge of the second opening (122) and the first flexible hook (140).

2. The optical fiber connector socket according to claim 1, wherein the first openings (121) and the second openings (122) are long-shaped holes and one end of each of the second openings (122) communicates with a middle section of the adjacent first opening (121).

3. The optical fiber connector socket according to claim 1, wherein the fastener (200) comprises a cover shell (210) and two first extended arms (211), wherein the cover shell (210) is disposed covering the insulated shell (100), wherein the two first extended arms (211) each connects the cover shell (210) and the corresponding first blocking piece (212).

4. The optical fiber connector socket according to claim 3, wherein when the fastener (200) is at the release position, each of the first blocking pieces (212) corresponds to the position of the corresponding first opening (121), wherein the contour of the each of the two first extended arms (211) corresponds to that of the second opening (122), wherein the each of the two first extended arms (211) passes through the corresponding second opening (122) into the insulated shell (100) and is able to move longitudinally with respect to and inside the corresponding second opening (122).

5. The optical fiber connector socket according to claim 1, wherein a pair of opposite positioning hooks (160) are disposed protruding from an external sidewall of the insulated shell (100), wherein each of the opposite positioning hooks (160) forms a stop plane (161) at a tip thereof and extends to form a stop ramp (162) from the stop plane (161) toward a bottom thereof.

6. An optical fiber connector socket, comprising:
an insulated shell (100) provided with two plug slots (110), wherein the two plug slots (110) are disposed in parallel and between two opposite sidewalls (120) of the insulated shell (100), wherein a narrow slot (101) and a connecting slot (102) which communicates with the two plug slots (110) and penetrates through the narrow slot (101) are formed between the two plug slots (110), wherein a first opening (121) and a second opening (122) communicating with the first opening (121) are formed on each of the two opposite side walls (120), wherein a first flexible hook (140) configured corresponding to the second opening (122) and a second flexible hook (150) configured corresponding to the connecting slot (102) are disposed in each of the two plug slots (110), wherein each of the first and second flexible hooks (140/150) is disposed separated from an inner wall of the corresponding plug slot (110), and
a fastener (200) comprising a cover shell (210) attachedly disposed on an outer wall of the insulated shell (100) and a linking piece (220) disposed in the narrow slot (101) and connected to the cover shell (210), wherein the cover shell (210) extends through the second openings (122) to form two first blocking pieces (212) each disposed between the corresponding first flexible hook (140) and an inner wall of the insulated shell (100), wherein the linking piece (220) extends through the connecting slot (102) to form two second blocking pieces (222) each into the corresponding plug slot (110), wherein each of the two second blocking pieces (222) is disposed between the corresponding second flexible hook (150) and the inner wall of the insulated shell (100),
wherein the fastener (200) can slide along axes of the plug slots (110) between a lock position and a release position, wherein when the fastener (200) is at the lock position, two sides of each of the first blocking pieces (212) individually press against an inner edge of the corresponding second opening (122) and the corresponding first flexible hook (140), and two sides of each of the second blocking pieces (222) individually press against an edge of the connecting slot (102) and the corresponding second flexible hook (150).

7. The optical fiber connector socket according to claim 6, wherein the first openings (121) and the second openings (122) are long-shaped holes and one end of each of the second openings (122) communicates with a middle section of the adjacent first opening (121).

8. The optical fiber connector socket according to claim 6, wherein the fastener (200) comprises two first extended arms (211) each connected between the corresponding first blocking pieces (212) and the cover shell (210), wherein the contour of each of the two first extended arms (211) corresponds to that of the second opening (122), wherein the each of the two first extended arms (211) passes through the corresponding second opening (122) into the insulated shell (100) and is able to move longitudinally with respect to and inside the corresponding second opening (122).

9. The optical fiber connector socket according to claim 6, wherein when the fastener (200) is at the release position, each of the first blocking pieces (212) corresponds to the position of the corresponding first opening (121).

10. The optical fiber connector socket according to claim 6, wherein the fastener (200) comprises two second extended arms (221) each connected between the corresponding second blocking piece (222) and the linking piece (220), wherein each of the two second extended arms (221) passes through the connecting slot (102) into the corresponding plug slot (110) and is able to move longitudinally with respect to and inside the connecting slot (102).

11. The optical fiber connector socket according to claim 6, wherein a pair of opposite positioning hooks (160) are disposed protruding from an external sidewall of the insulated shell (100), wherein each of the opposite positioning hooks (160) forms a stop plane (161) at a tip thereof and forms a stop ramp (162) from the stop plane (161) toward a bottom thereof.

* * * * *